United States Patent
Chen et al.

(10) Patent No.: US 11,290,982 B2
(45) Date of Patent: Mar. 29, 2022

(54) NOTIFICATIONS CONCERNING UE UNREACHABILITY

(71) Applicant: Telefonaktiebolaget LM Ericsson (publ), Stockholm (SE)

(72) Inventors: Qian Chen, Mölndal (SE); Roland Gustafsson, Bengtsfors (SE); Stefan Rommer, Västra Frölunda (SE); Hans Rönneke, Kungsbacka (SE); Paul Schliwa-Bertling, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/046,490

(22) PCT Filed: Apr. 10, 2019

(86) PCT No.: PCT/EP2019/059073
§ 371 (c)(1),
(2) Date: Oct. 9, 2020

(87) PCT Pub. No.: WO2019/197461
PCT Pub. Date: Oct. 17, 2019

(65) Prior Publication Data
US 2021/0076352 A1 Mar. 11, 2021

Related U.S. Application Data

(60) Provisional application No. 62/655,338, filed on Apr. 10, 2018.

(51) Int. Cl.
*H04W 76/30* (2018.01)
*H04W 68/00* (2009.01)
*H04W 76/27* (2018.01)
*H04W 52/02* (2009.01)

(52) U.S. Cl.
CPC ..... *H04W 68/005* (2013.01); *H04W 52/0241* (2013.01); *H04W 76/27* (2018.02)

(58) Field of Classification Search
None
See application file for complete search history.

(56) References Cited

U.S. PATENT DOCUMENTS

2018/0199398 A1* 7/2018 Dao ............... H04L 67/14
2019/0110329 A1* 4/2019 Tang ............... H04L 41/08

FOREIGN PATENT DOCUMENTS

EP 3 001 702 A1 3/2016

OTHER PUBLICATIONS

International Search Report and Written Opinion issued in International Application No. PCT/EP2019/059073 dated Jun. 12, 2019 (20 pages).

(Continued)

*Primary Examiner* — Gary Lafontant
(74) *Attorney, Agent, or Firm* — Rothwell, Figg, Ernst & Manbeck, P.C.

(57) ABSTRACT

Embodiments herein related to notifications concerning UE unreachability. Especially, the embodiments herein provide methods performed by an Access and Mobility Management Function, AMF, as well as a corresponding Access and Mobility Management Function, AMF, relating to notifications concerning UE unreachability.

14 Claims, 8 Drawing Sheets

(56) References Cited

OTHER PUBLICATIONS

International Preliminary Report on Patentability issued in International Application No. PCT/EP2019/059073, dated May 26, 2020, (19 pages).
Erisson, "Solution for High latency communication", SA WG2 Temporary Document, SA WG2 Meeting #126, S2-181906, Montreal, Canada, Feb. 26-Mar. 2, 2018 (5 pages).
3GPP TR 23.724 V0.5.0 (Jul. 2018), 3rd Generation Partnership Project; Technical Specification Group Services and System Aspects; Study on Cellular IoT support and evolution for the 5G System (Release), Jul. 2018 (218 pages).
3GPP TS 23.502 V0.4.0 (May 2017), 3rd Generation Partnership Project; Technical Specification Group Services and System Aspects; Procedures for the 5G System; Stage 2 (Release 15), May 2017 (126 pages).
Ericsson, "Solution 7 improvement", SA WG2 Temporary Document, SA WG2 Meeting #S2-128, S2-187613, Vilnius, Lithuania, Jul. 2-6, 2018 (7 pages).
Ericsson, "Finalizing the UE Reachability Procedure with RRC Inactive handling (OI#13)" SA WG2 Temporary Document, SA WG2 Meeting #123, S2-178173, Ljubljiana, Slovenia, Oct. 23-27, 2017 (5 pages).
Andreas Kunz et al., "Enhanced 3GPP system for Machine Type Communications and Internet of Things", 2015 IEEE Conference on Standards for Communications and Networking (CSCN), 2015 (6 pages).
3GPP TR 23.724 V0.2.0 (Mar. 2018), 3rd Generation Partnership Project; Technical Specification Group Services and System Aspects; Study on Cellular IoT support and evolution for the 5G System (Release 16), Mar. 2018 (64 pages).
3GPP TS 23.682 V15.4.0 (Mar. 2018), 3rd Generation Partnership Project; Technical Specification Group Services and System Aspects; Architecture enhancements to facilitate communications with packet data networks and applications (Release 15), Mar. 2018 (124 pages).
3GPP TS 23.502 V15.0.0 (Dec. 2017), 3rd Generation Partnership Project; Technical Specification Group Services and System Aspects; Procedures for the 5G System; Stage 2 (Release 15), Dec. 2017 (258 pages).
3GPP TS 23.501 V15.0.0 (Dec. 2017), 3rd Generation Partnership Project; Technical Specification Group Services and System Aspects; System Architecture for the 5G System; Stage 2 (Release 15), Dec. 2017 (181 pages).

* cited by examiner

NOTIFICATIONS CONCERNING UE UNREACHABILITY

CROSS REFERENCE TO RELATED APPLICATION(S)

This application is a 35 U.S.C. § 371 National Stage of International Patent Application No. PCT/EP2019/059073, filed Apr. 10, 2019, designating the United States and claiming priority to U.S. provisional patent application No. 62/655,338, filed on Apr. 10, 2018. Each one of the above identified applications is hereby incorporated by reference.

TECHNICAL FIELD

Disclosed are embodiments related to notifications concerning UE unreachability.

SUMMARY

A new Radio Resource Control (RRC) state is defined in New Radio (NR). This new state is the RRC Inactive state. A UE can transition to the RRC Inactive state from the RRC Connected stated, and the UE can transition to the RRC Connected state from the RRC Inactive state. When the UE is in the RRC Inactive state the UE is not reachable, and it would be advantageous for the communications network to store downlink data for the UE until the UE becomes reachable.

When a UE attached to an access network (AN) is in the RRC Inactive state, a user plane function (UPF) may receive downlink (DL) data for the UE that was transmitted by an application server (AS), and the UPF may, without delay (i.e., without extended buffering), provide the DL data to the AN for delivery to the UE. Because the UE is in the RRC Inactive state, however, it may not be possible for the AN to provide the DL data to the UE, resulting in a data delivery failure (DDN failure) and resulting in the AN sending a notification of the data delivery failure to a core network function (e.g., AMF). Also, the AN is generally not aware that an "Availability after DDN failure" notification shall be sent to the AS directly or via a Services Capability Server (SCS) (i.e. that an "Availability after DDN failure" event notification has been configured for the UE in the core network). This disclosure describes how an "Availability after DDN failure" notification can be sent to the AS even when RRC Inactive is used.

BRIEF DESCRIPTION OF THE DRAWINGS

The accompanying drawings, which are incorporated herein and form part of the specification, illustrate various embodiments.

DETAILED DESCRIPTION

Figure 1:
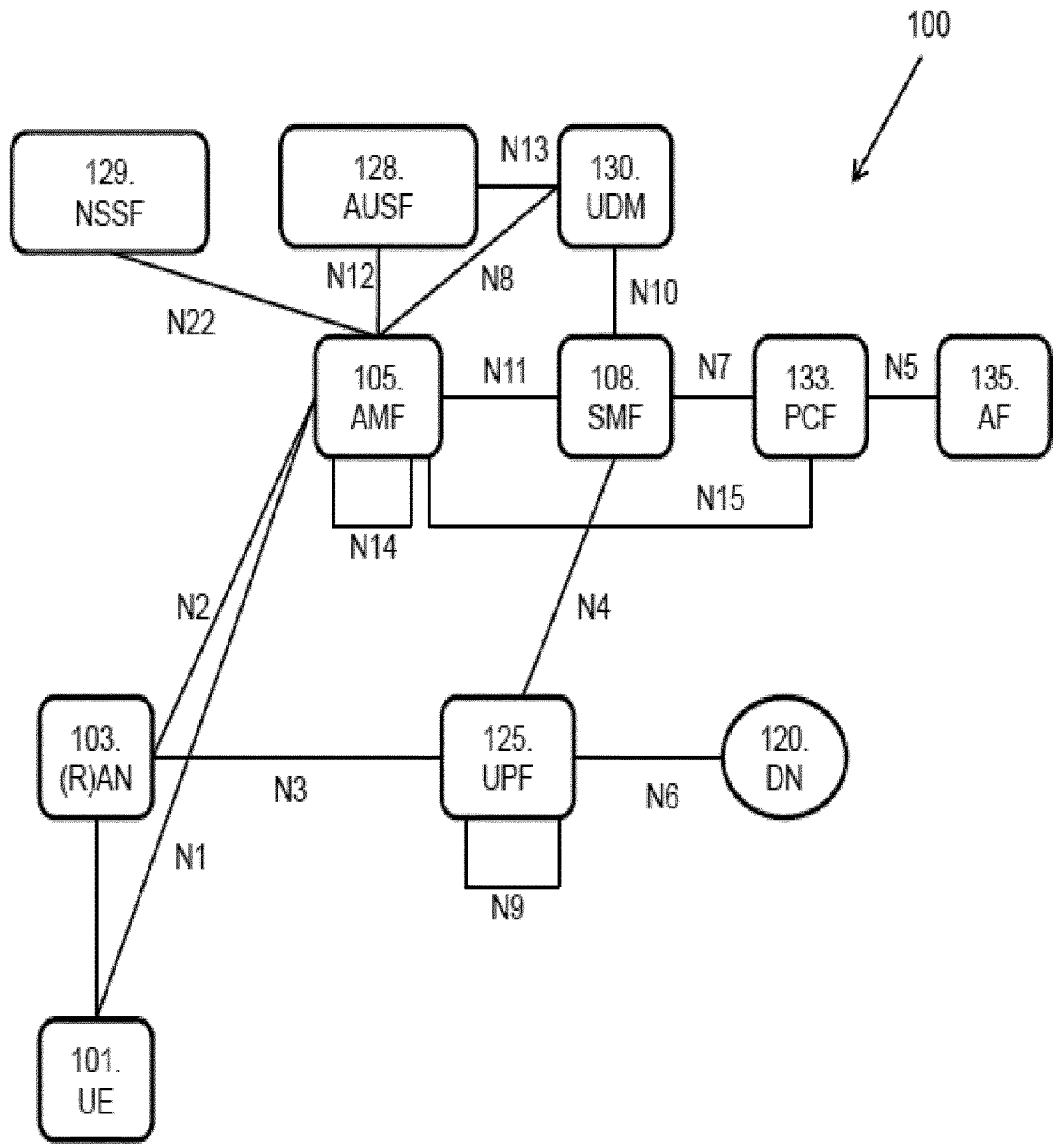
FIG. 1 illustrates a communications network according to one embodiment.

FIG. 1 illustrates a communications network 100 according to one embodiment. More specifically, FIG. 1 illustrates a UE 101 that is connected to an access network 103, which may be a RAN. AN 103 is connected to an Access and Mobility Management Function (AMF) 105 via a N2 reference point, and UE 101 is connected to AMF 105 via a N1 reference point. AMF 105 is adapted to be connected to a Session Management Function (SMF) 108 via a N11 reference point. SMF 108 is adapted to be connected to a User plane Function (UPF) 125 via an N4 reference point, and AN 103 is adapted to be connected to UPF 125 via a N3 reference point. UPF 125 is adapted to be connected to a data network (DN) 120 via a N6 reference point. The DN may be e.g. operator services, Internet access or 3rd party services. The AMF 105 is adapted to be connected to an Authentication Server Function (AUSF) 128 via a N12 reference point. The AMF 105 is adapted to be connected to a Network Slice Selection Function (NSSF) 129 via a N22 reference point. The AMF 105 is adapted to be connected to a Unified Data Management (UDM) 130 via a N8 reference point. The AUSF 128 is adapted to be connected to the UDM 130 via the N13 reference point. The SMF 108 is adapted to be connected to the UDM 130 via a N10 reference point. The SMF 108 is adapted to be connected to a Policy Control function (PCF) 133 via a N7 reference point. The PCF 133 is adapted to be connected to an Application Function (AF) 135 via a N5 reference point. The PCF 133 is adapted to be connected to the AMF 105 via a N15 reference point. A reference point may also be referred to as an interface.

UE 101 may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device or any type of consumer electronic, for instance but not limited to television, radio, lighting arrangements, tablet computer, laptop or Personal Computer (PC). UE 101 may be portable, pocket storable, hand held, computer comprised, or vehicle mounted devices, enabled to communicate voice and/or data, via the radio access network, with another entity, such as another UE or a server.

The AN 103 may comprise a AN node (not shown in FIG. 1) such as a NodeB, an eNodeB, a gNB or any other network unit capable to communicate over a radio carrier with the UE 101. The abbreviations AN and RAN may be used interchangeably herein when referring to an access network, a radio access network, a node (e.g., gNB or other base station) comprised in the access network. The AN may include both 3GPP radio access network and non-3GPP access network. A typical non-3GPP access network is a Wi-Fi network. The embodiments in this disclosure apply to both 3GPP radio access network and non-3GPP access network.

Described herein are various options for extended buffering of DL data for UE 101.

Figure 2:
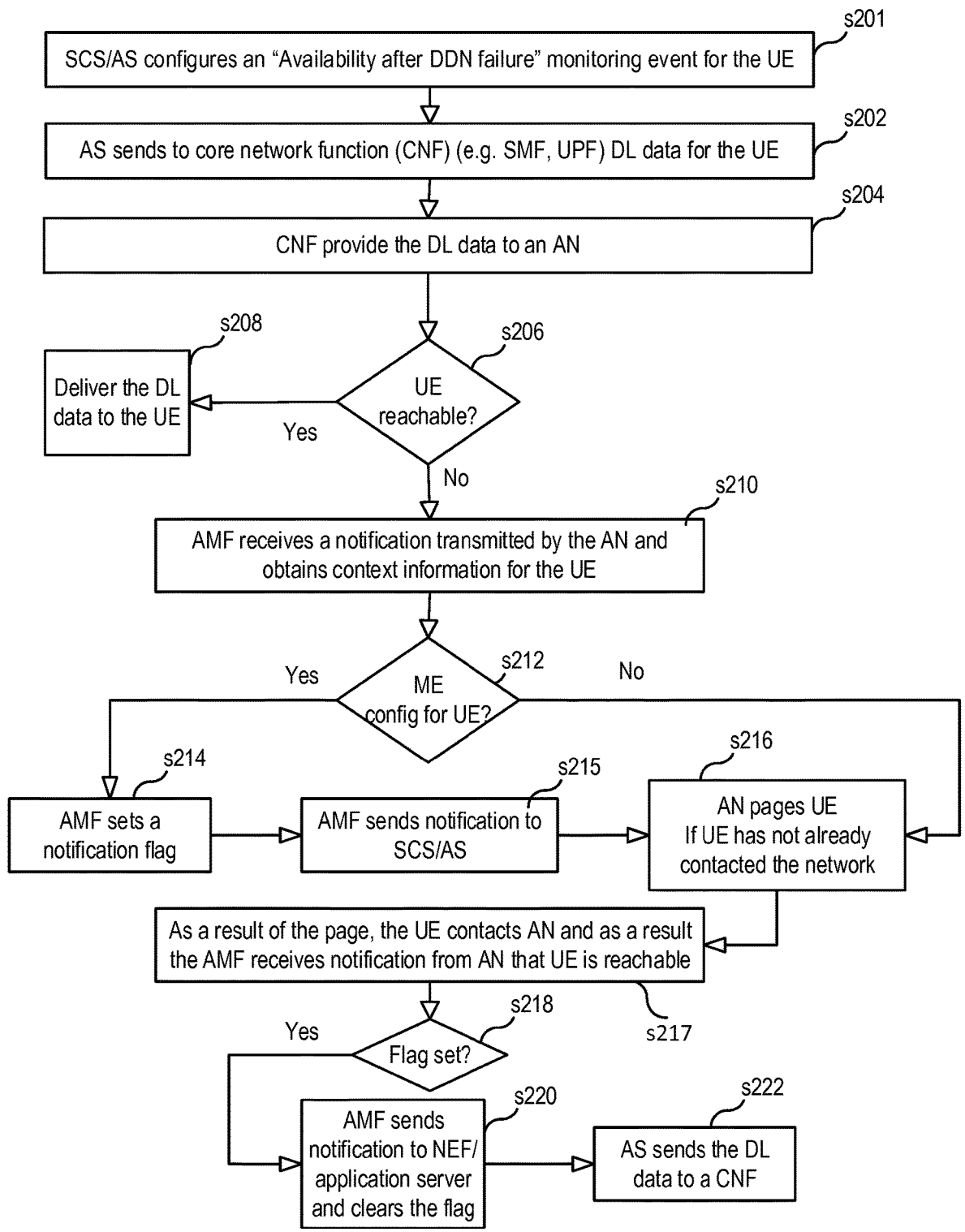
FIG. 2 is a flow chart illustrating a process according to one embodiment.

FIG. 2 is flowchart illustrating a process 200 according to an embodiment. Process 200 may begin in step s201.

In step s201, a server hosting an application (i.e., an AS) (or an SCS providing services the AS) configures an "Availability after DDN failure" monitoring event for UE 101.

This results in that the UDM 130 and the AMF 105 have the event configured in their contexts.

Figure 3:
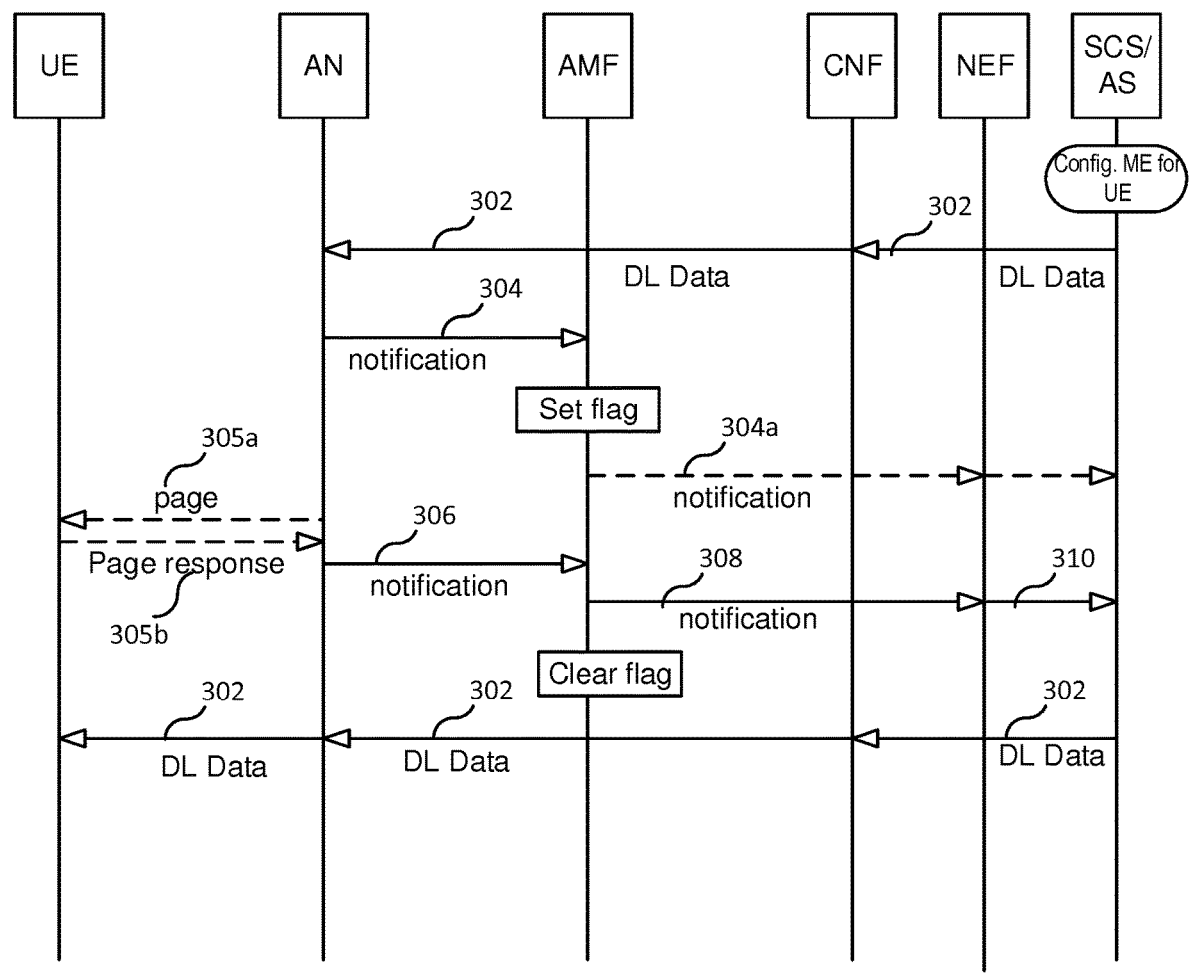
FIG. 3 is a message flow diagram according to one embodiment.

In step s202, a core network function (CNF) (e.g., SMF 108, UPF 125) receives DL data 302 (see FIG. 3) for UE 101 that originated from, for example, the AS.

In steps s204, the CNF delivers the DL data 302 to AN 103 (e.g., UPF 125 may deliver the DL data to AN 103 using an existing N3 tunnel).

In step s206, AN 103 receives the DL data and checks the UE reachability in RRC Inactive mode. If the UE is reachable, AN 103 provides the DL data to the UE (step s208).

In step s210, if UE is not reachable (e.g., due to Key Issue 4 (eDRX/DRX power saving state), if AN paging fails, etc.), the AN sends to AMF 105 a notification 304 (e.g. an N2 Notification) to indicate the unreachability and data delivery failure, and the AMF receives the notification transmitted by the AN and obtain context information for the UE (e.g., Mobility Management (MM) context information associated with the UE). AN 103 may also provide buffering support information, if there is any. If the UE was not reachable due to eDRX/DRX (Key Issue 4), the AN schedules a paging of the UE 101 next time it will be reachable by paging. If the UE was not reachable for other reasons (e.g., AN paging failed when UE was unreachable (e.g. the UE was located underground or in a tunnel)), AN may schedule additional paging(s). AN may discard the DL data after a timeout.

In step s212, in response to receiving the notification 304 transmitted by the AN in step s210, AMF 105 determines whether the context information includes information indicating that a certain monitoring event (ME) is configured for the UE (e.g., the AMF determines, based on the context information, whether an "Availability after DDN failure" ME is configured for the UE.

In step s214, as a result of determining that the certain ME is configured for the UE, the AMF sets a notification flag (e.g., the "Notify on Availability after DDN Failure" flag). AMF may set the notification flag by setting the flag to a value of 1 or TRUE.

In some embodiments, step s215 is performed. In step s215, the AMF sends an event notification 304a to the NEF as a confirmation that i) the DL data 302 was received and ii) an "Availability after DDN failure" notification will be sent as soon as the UE becomes available. The NEF then provides this notification to the SCS/AS.

In step s216, if the UE does not contact the network (e.g., no mobile originating (MO) event happens) before the scheduled page in AN, the AN sends a page 305 to the UE when scheduled. In this example, we shall assume that the UE contacts the network (e.g., transmits a response 305b) as a result of being paged, thereby indicating that the UE is now reachable, and the UE is placed in the RRC active state. If the UE contacted the network before the scheduled page (e.g., due to an MO event), then the UE may be placed in the RRC active state as a result of the UE contacting the network (i.e. the UE becomes reachable). In either case, the AN sends a reachability notification 306 to the AMF.

In step s217, after the UE contacts the network (e.g., after being paged or after an MO event) the AMF receives the notification 306 indicating that the UE is reachable (e.g. an N2 notification triggered by an RRC resume or a N2 Path Switch Request if RRC resume triggers a AN node change). For example, in step s216 the AMF receives a message transmitted by an AN, which message includes information indicating that the UE is reachable. For example, the AN may transmit the message in response to the UE contacting the AN or after the AN sends to the UE an RRC resume message.

In step s218, the AMF checks whether the notification flag is set.

In step s220, as a result of receiving the notification 306 and determining that the flag is set, the AMF sends a notification 308 for the AS (e.g. the AMF sends notification 308 to an Network Exposure Function (NEF), which, using an API message 310, forwards the notification to the AS (e.g., NEF forwards the notification to an SCS serving the AS, which then notifies the AS), and the AMF also clears the notification flag (e.g., set the flag to a value of 0 or FALSE).

In steps s222, in response to receiving the notification 310, the AS re-sends the DL data for the UE. The CNF (e.g., UPF) receives the DL data and forwards the DL data to the AN. The AN send the DL data to the UE.

Figure 4:
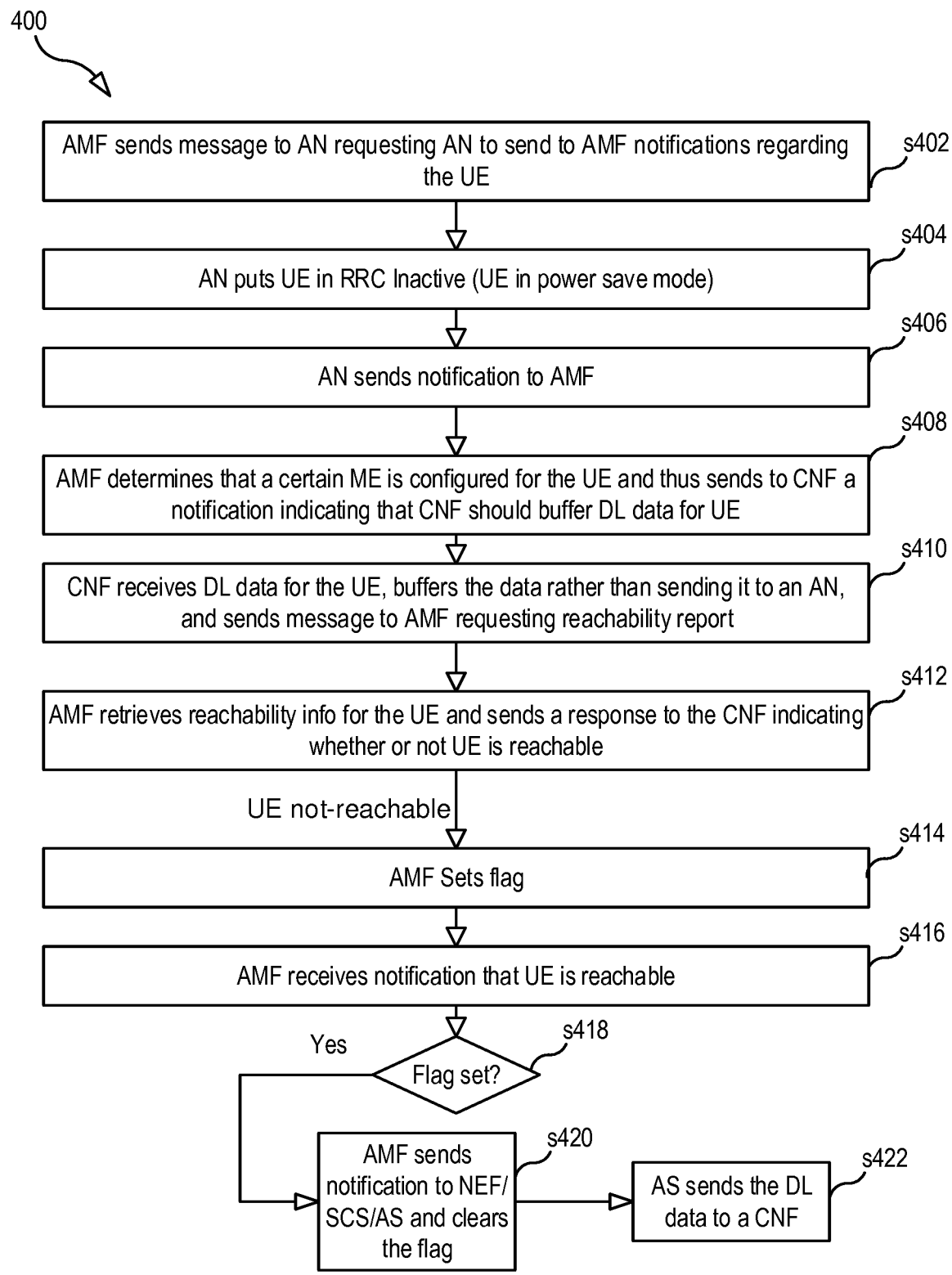
FIG. 4 is a flow chart illustrating a process according to one embodiment.

FIG. 4 is flowchart illustrating a process 400 according to one embodiment. Process 400 may begin in step s402.

Figure 5:
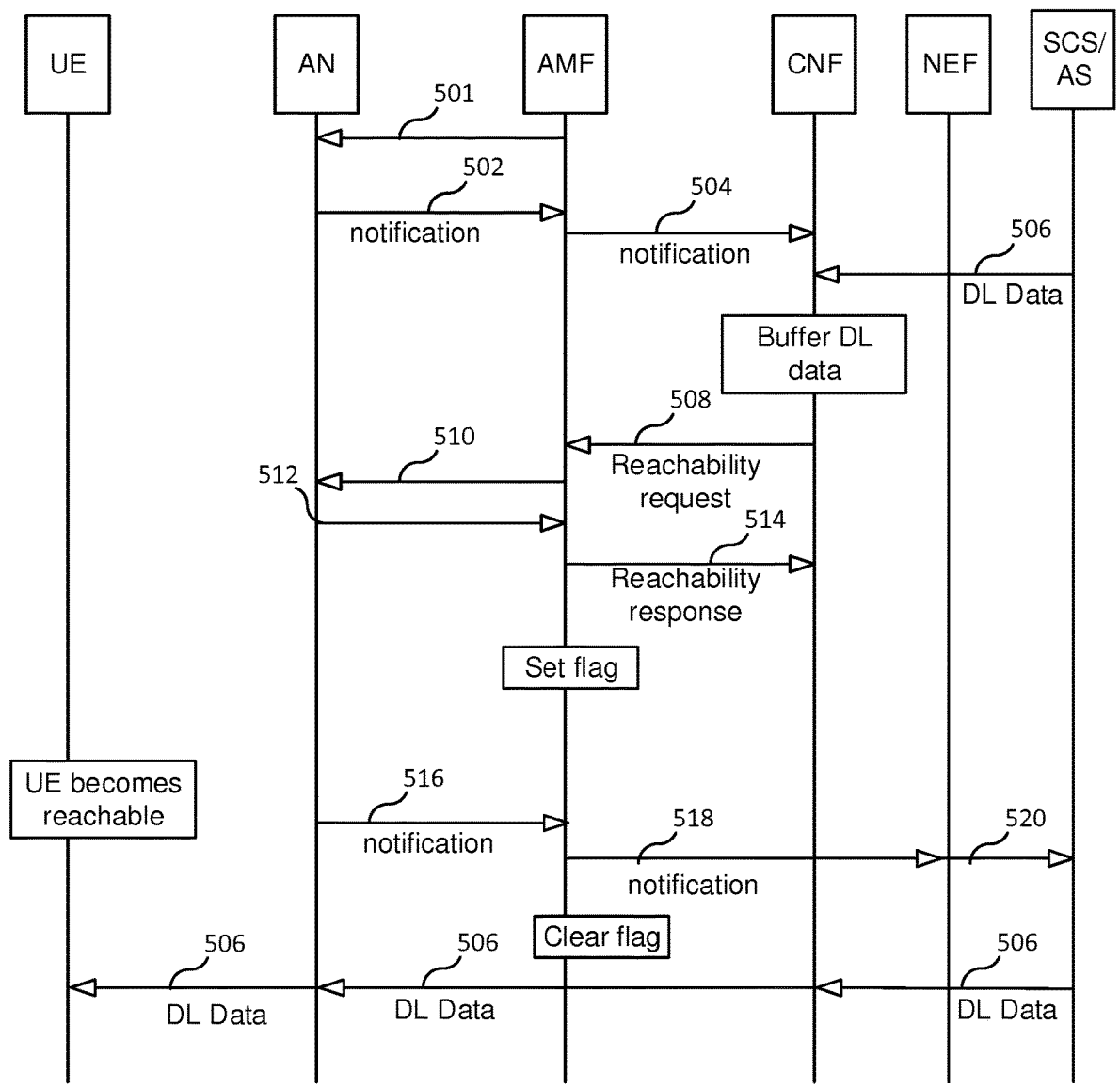
FIG. 5 is a message flow diagram according to one embodiment.

In step s402, AMF 105 sends to the AN 103 a message 501 (see FIG. 5) requesting the AN to send to the AMF notifications regarding a certain UE with power save mode. In some embodiments, before sending message 501, the AMF first obtains context information for the UE (e.g. MM context information) and determines whether the context information indicates that the certain ME (e.g., Availability after DDN failure) is configured for the UE, and the AMF sends message 501 as a result of determining that the certain ME is configured for the UE.

In step s404, the AN puts the UE in RRC Inactive state.

In step s406, AN 103 sends a notification 502 (see FIG. 5) to AMF 105 regarding UE 101. In this example, the notification is an N2 notification indicating that the AN has placed the UE 101 in RRC Inactive state and the UE is in power save mode due to KI4 (e.g., eDRX/DRX). The notification may include buffering support information.

In step s408, in response to receiving the notification 502 and determining that the certain ME is configured for the UE, The AMF sends to a CNF (e.g., SMF/UPF) a notification 504 (see FIG. 5) that a PDU session for UE 101 is subject for extended data buffering and provides buffering support information (e.g. buffering duration) based on known info (e.g. negotiated eDRX/DRX interval) and/or buffering supporting info from AN. The message used by AMF to send to SMF/UPF the notification and buffer support information can be the existing Nsmf_PDUSession-_UpdateSMContext service or Namf_EventExpousre_Notify service, or any new service to deliver the information. If data is buffered in the UPF and not in SMF, the SMF can send the notification 504 to the UPF.

In step s410, the AS sends downlink (DL) data for the UE, which DL data is received by the CNF, and the CNF applies extended buffering for the received DL data rather than sending the DL data to an AN without delay, and the CNF also sends a message 508 (reachability request) (see FIG. 5) to the AMF to obtain reachability information for the UE.

In step s412, the AMF, in response to reachability request 508, retrieves reachability information concerning the UE and sends to the CNF a message 514 (reachability response). For example, in step s412 the AMF sends a request 510 to the AN and receives a response 512 transmitted by the AN, which response comprises the reachability information for the UE.

In step s414, assuming the reachability information retrieved in step s412 indicates that the UE is not reachable, the AMF sets the notification flag.

In step s416, the AMF receives a notification 516 indicating that the UE is reachable (e.g. an N2 notification triggered by an RRC resume or a N2 Path Switch Request if RRC resume triggers a AN node change). For example, in step s416 the AMF receives a message transmitted by an AN, which message includes information indicating that the UE is reachable. For example, the AN may transmit the message in response to the UE contacting the AN or after the AN sends to the UE an RRC resume message.

In step s418, the AMF checks whether the notification flag is set.

In step s420, as a result of receiving the notification 516 and determining that the flag is set, the AMF sends a notification 518 for the AS (e.g. the AMF sends notification 518 to the NEF, which forwards the notification to the AS, and the AMF also clears the notification flag.

In steps s422, the AS, in response to receiving the notification 308, re-sends the DL data for the UE.

Figure 6:
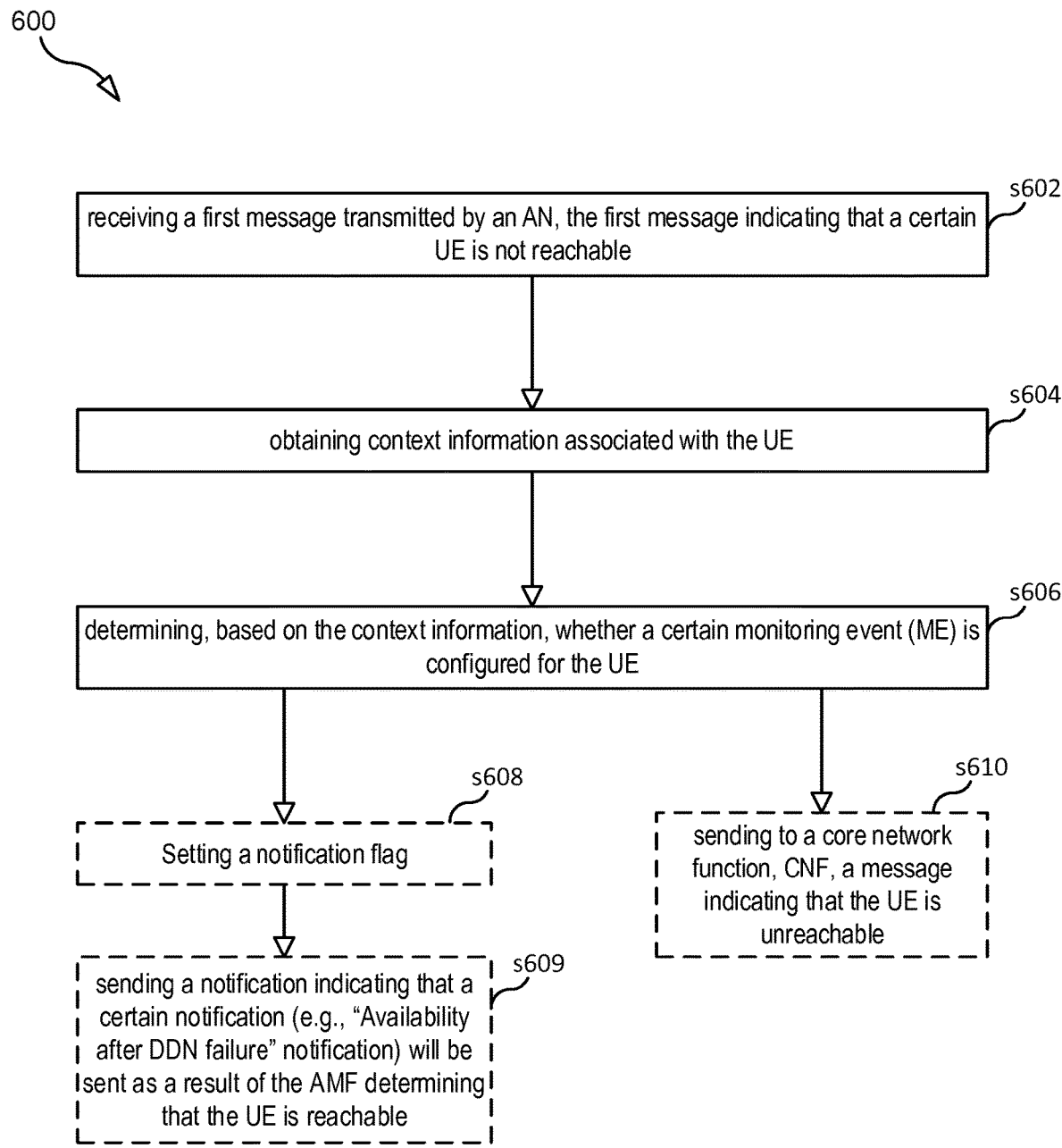
FIG. 6 is a flow chart illustrating a process according to one embodiment.

FIG. 6 is a flow chart illustrating a process 600, according to one embodiment, performed by the AMF. Process 600 may begin in step 602.

In step s602, the AMF receives a first message transmitted by an AN, the first message indicating that a certain UE is not reachable.

In step s604, the AMF obtains context information associated with the UE.

In step s606, the AMF determines, based on the context information, whether a certain monitoring event (ME) is configured for the UE (e.g., the "Availability after DDN failure" ME).

After steps s606, the AMF performs one or more of steps s608, s609 and s610.

In step s608, the AMF, as a result of receiving the first message indicating that the UE is not reachable and determining that the certain ME is configured for the UE, sets a notification flag.

In step s609, the AMF sends a notification indicating that a certain notification (e.g., "Availability after DDN failure" notification) will be sent as a result of the AMF determining that the UE is reachable. For example, as described above, the AMF may send to the NEF notification 304a, which notification indicates that the AMF will send to the NEF an "Availability after DDN failure" notification as a result of the AMF determining that the UE is reachable.

In step s610, the AMF sends to a CNF (e.g., SMF or UPF) a message indicating that the UE is not reachable.

Figure 7:
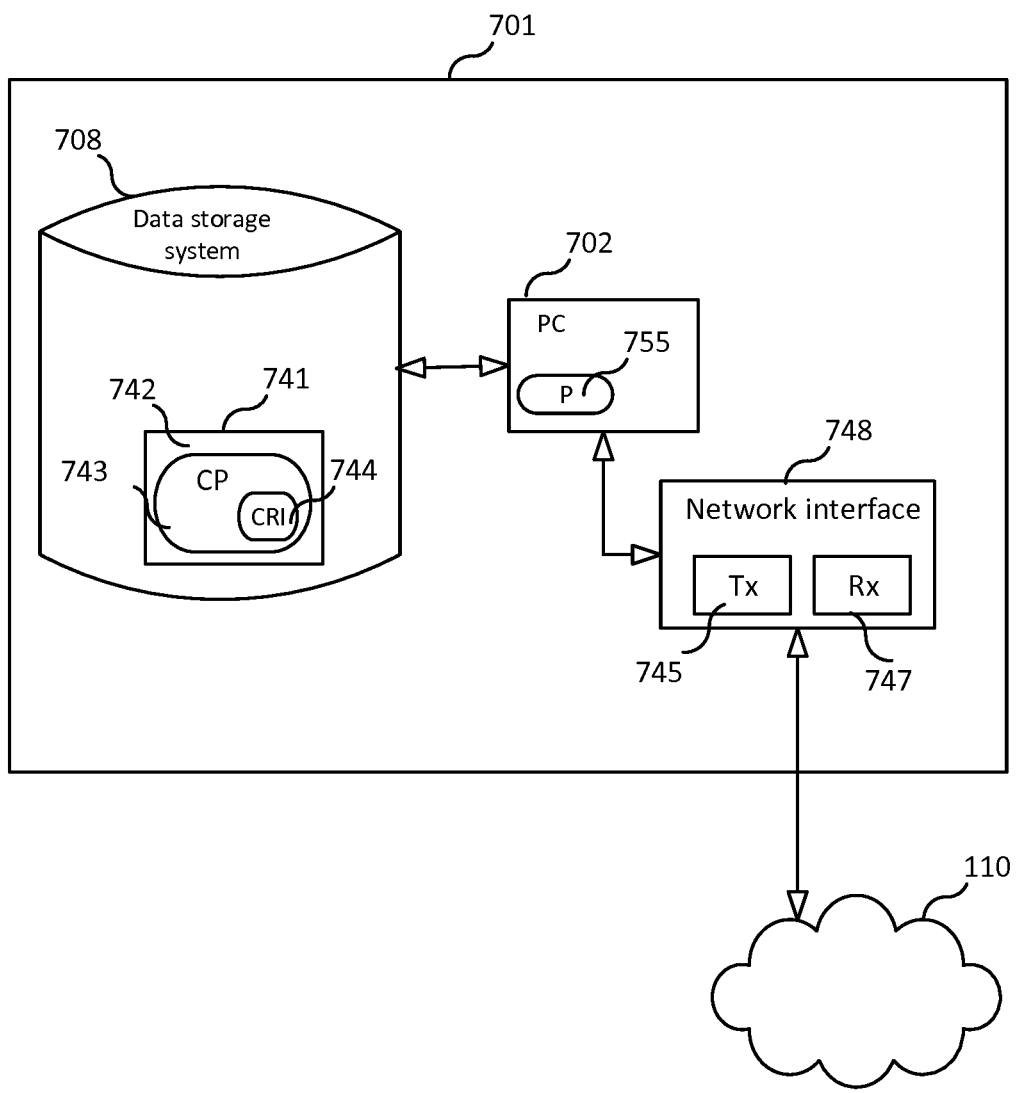
FIG. 7 is a block diagram of a network node according to one embodiment.

FIG. 7 is a block diagram of network node 701 for implementing AMF 105, according to some embodiments. As shown in FIG. 7, network node 701 may comprise: processing circuitry (PC) 702, which may include one or more processors (P) 755 (e.g., a general purpose microprocessor and/or one or more other processors, such as an application specific integrated circuit (ASIC), field-programmable gate arrays (FPGAs), and the like); a network interface 748 comprising a transmitter (Tx) 745 and a receiver (Rx) 747 for enabling network node 701 to transmit data to and receive data from other nodes connected to a network 110 (e.g., an Internet Protocol (IP) network) to which network interface 748 is connected; and a local storage unit (a.k.a., "data storage system") 708, which may include one or more non-volatile storage devices and/or one or more volatile storage devices. In embodiments where PC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some embodiments, the CRI 744 of computer program 743 is configured such that when executed by PC 702, the CRI causes network node 701 to perform steps described herein (e.g., steps described herein with reference to the flow charts). In other embodiments, network node 701 may be configured to perform steps described herein without the need for code. That is, for example, PC 702 may consist merely of one or more ASICs. Hence, the features of the embodiments described herein may be implemented in hardware and/or software.

Figure 8:
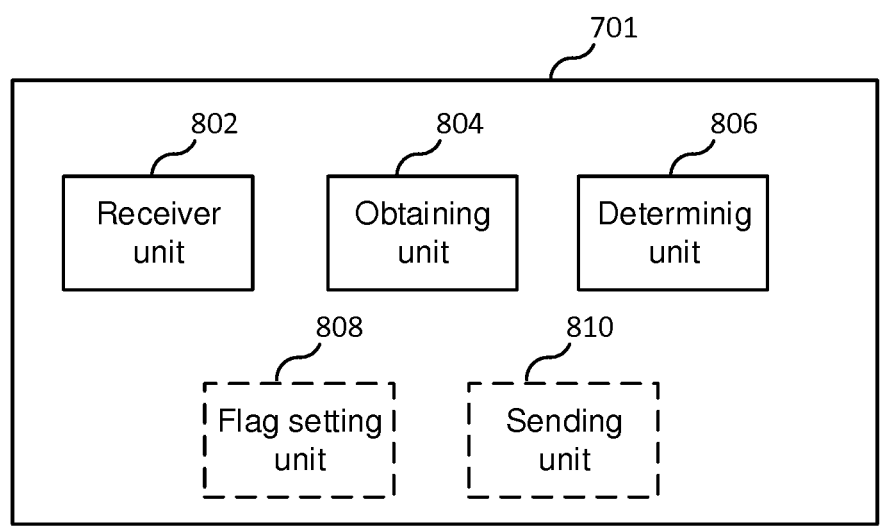
FIG. 8 is a diagram showing functional units of a network node according to one embodiment.

FIG. 8 is a diagram showing functional units of network node 701 according to one embodiment. As shown in FIG. 8, network node 701 may include: a receiver unit 802 for receiving a first message transmitted by an AN, the first message indicating that a certain UE is not reachable; an obtaining unit 804 for obtaining context information associated with the UE; and a determining unit 806 for determining, based on the context information, whether a certain monitoring event (ME) is configured for the UE (e.g., the "Availability after DDN failure" ME). Network node 701 may further include at least one of: a flag setting unit 808 for setting a notification flag as a result of the receiver unit receiving the first message indicating that the UE is not reachable and the determining unit determining that the certain ME is configured for the UE, and a sending unit 810 for sending to a core network function, CNF, a message indicating that the UE is unreachable as a result of the receiver unit receiving the first message indicating that the UE is not reachable and the determining unit determining that the certain ME is configured for the UE.

Embodiments

A1. A method (600 (see FIG. 6)) performed by an AMF (105), the method comprising:

receiving a first message transmitted by an AN (step s602), the first message indicating that a certain UE is not reachable;

obtaining context information associated with the UE (step s604);

determining, based on the context information, whether a certain monitoring event (ME) is configured for the UE (e.g., the "Availability after DDN failure" ME) (step s606); and as a result of receiving the first message indicating that the UE is not reachable and determining that the certain ME is configured for the UE, the AMF setting a notification flag (step s608).

A2. The method of embodiment A1, further comprising: after setting the notification flag, the AMF receiving a notification indicating that the UE is reachable;

after receiving the notification indicating that the UE is reachable, the AMF determining whether the notification flag is set; and as a result of determining that the notification flag is set, the AMF provide a notification for an application server so that the application server can send buffered downlink data for the UE.

A3. The method of embodiment A1 or A2, further comprising:

prior to receiving the first message transmitted by the AN, the AMF transmitting to the AN a second message, the second message requesting information about the UE.

A4. The method of any one of embodiments A1 or A2, further comprising:

prior to receiving the first message transmitted by the AN, the AMF receiving a second message transmitted by the AN, the second message indicating that the UE is not reachable; and in response to receiving the second message and determining that the certain ME is configured for the UE, the AMF sending to a core network function, CNF, a message indicating that the UE is unreachable (e.g., a PDU session for the UE is subject for high latency communication, HLCOM).

A5. The method of embodiment A4, further comprising:
after transmitting the message to the CNF, the AMF receiving from the CNF a message requesting reachability information for the UE; and in response to the message from the CNF, the AMF obtaining reachability information for the UE, which information indicates whether the UE is reachable, and forwarding the obtained reachability information to the CNF, wherein obtaining the reachability information for the UE comprises obtaining the reachability information from the first message.

A6. The method of any one of embodiments A1-A5, further comprising:
as a result of receiving the first message indicating that the UE is not reachable and determining that the certain ME is configured for the UE, the AMF sending a notification (304a) indicating that a certain notification (e.g., "Availability after DDN failure" notification) will be sent as a result of the AMF determining that the UE is reachable.

B1. A method (600 (see FIG. 6)) performed by an AMF, the method comprising:
receiving a first message transmitted by an AN (step s602), the first message indicating that a certain UE is not reachable;
obtaining context information associated with the UE (step s604);
determining, based on the context information, whether a certain monitoring event (ME) is configured for the UE (e.g., the "Availability after DDN failure" ME) (step s606); and
as a result of receiving the first message and determining that the certain ME is configured for the UE, the AMF sending to a core network function, CNF, a message indicating that the UE is unreachable (e.g., a PDU session for the UE is subject for high latency communication, HLCOM) (step s610).

B2. The method of embodiment B1, further comprising:
after sending the message to the CNF, the AMF receiving from the CNF a message requesting reachability information for the UE; and
in response to the message from the CNF, the AMF obtaining reachability information for the UE, which information indicates whether the UE is reachable, and forwarding the obtained reachability information to the CNF.

B3. The method of embodiment B2, further comprising:
the AMF determining that the obtained reachability information indicates that the UE is not reachable; and
as a result of determining that the obtained reachability information indicates that the UE is not reachable and determining that the certain ME is configured for the UE, the AMF the AMF setting a notification flag.

B4. The method of embodiment B3, further comprising:
after setting the notification flag, the AMF receiving a notification indicating that the UE is reachable;
after receiving the notification indicating that the UE is reachable, the AMF determining whether the notification flag is set; and
as a result of determining that the notification flag is set, the AMF providing a notification for an application so that the application can send buffered downlink data for the UE.

B5. The method of embodiment A2 or B4, wherein providing the notification for the application server comprises sending the notification to a Network Exposure Function (NEF).

C1. A network node (701) adapted to perform any one of the above described methods.

D1. A network node (701), the network node comprising:
a receiver unit (802, see FIG. 8) for receiving a first message transmitted by an AN, the first message indicating that a certain UE is not reachable;
an obtaining unit (804) for obtaining context information associated with the UE;
a determining unit (806) for determining, based on the context information, whether a certain monitoring event (ME) is configured for the UE (e.g., the "Availability after DDN failure" ME); and
at least one of:
a flag setting unit (808) for setting a notification flag as a result of the receiver unit receiving the first message indicating that the UE is not reachable and the determining unit determining that the certain ME is configured for the UE, and
a sending unit (810) for sending to a core network function, CNF, a message indicating that the UE is unreachable as a result of the receiver unit receiving the first message indicating that the UE is not reachable and the determining unit determining that the certain ME is configured for the UE.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

ABBREVIATIONS

AN Access Network
AMF Access and Mobility Management Function
AUSF Authentication Server Function
CNF Core Network Function
UDM Unified Data Management
DL Downlink
UL Uplink
DN Data Network
PCF Policy Control function
AF Application Function
HLCOM high latency communication
MO mobile originated
RRC Radio Resource Control
NR New Radio
NSSF Network Slice Selection Function
UE User Equipment
RAN radio access network
UPF User Plane Function
SMF Session Management Function
PDU Protocol Data Unit

The invention claimed is:

1. A method performed by an Access and Mobility Management Function (AMF), the method comprising:
   receiving a first message transmitted by an access network (AN), the first message indicating that a certain User Equipment (UE) is not reachable, wherein the UE is in Radio Resource Control (RRC) inactive state when it is not reachable, and wherein the first message is a result of that it is not possible for the AN to provide downlink (DL) data to the UE;
   obtaining context information associated with the UE;
   determining, based on the context information, whether a certain monitoring event (ME) is configured for the UE; and
   as a result of receiving the first message indicating that the UE is not reachable and determining that the certain ME is configured for the UE, the AMF setting a notification flag.

2. The method of claim 1, further comprising:
   after setting the notification flag, the AMF receiving a notification indicating that the UE is reachable;
   after receiving the notification indicating that the UE is reachable, the AMF determining whether the notification flag is set; and
   as a result of determining that the notification flag is set, the AMF providing a notification for an application server so that the application server can send buffered downlink data for the UE.

3. The method of claim 1, further comprising:
   prior to receiving the first message transmitted by the AN, the AMF transmitting to the AN a second message, the second message requesting information about the UE.

4. The method of claim 1, further comprising:
   prior to receiving the first message transmitted by the AN, the AMF receiving a second message transmitted by the AN, the second message indicating that the UE is not reachable; and
   in response to receiving the second message and determining that the certain ME is configured for the UE, the AMF sending to a core network function (CNF) a message indicating that the UE is unreachable.

5. The method of claim 4, wherein the message indicating that the UE is unreachable indicates that a Protocol Data unit (PDU) session for the UE is subject for high latency communication (HLCOM).

6. The method of claim 4, further comprising:
   after transmitting the message to the CNF, the AMF receiving from the CNF a message requesting reachability information for the UE;
   in response to the message from the CNF, the AMF obtaining reachability information for the UE, which information indicates whether the UE is reachable; and
   forwarding the obtained reachability information to the CNF, wherein obtaining the reachability information for the UE comprises obtaining the reachability information from the first message.

7. The method of claim 1, further comprising:
   as a result of receiving the first message indicating that the UE is not reachable and determining that the certain ME is configured for the UE, the AMF sending a notification indicating that a certain notification will be sent as a result of the AMF determining that the UE is reachable.

8. An Access and Mobility Management Function (AMF) being configured to:
   receive a first message transmitted by an access network (AN), the first message indicating that a certain User Equipment (UE) is not reachable, wherein the UE is in Radio Resource Control (RRC) inactive state when it is not reachable, and wherein the first message is a result of that it is not possible for the AN to provide downlink (DL) data to the UE;
   obtain context information associated with the UE;
   determine, based on the context information, whether a certain monitoring event (ME) is configured for the UE; and
   set a notification flag as a result of receiving the first message indicating that the UE is not reachable and determining that the certain ME is configured for the UE.

9. The AMF of claim 8, further being configured to:
   receive a notification indicating that the UE is reachable after setting the notification flag;
   determine whether the notification flag is set after receiving the notification indicating that the UE is reachable; and
   as a result of determining that the notification flag is set, provide to an application server a notification notifying the application server that the application server can send buffered downlink data for the UE.

10. The AMF of claim 8, further being configured to:
    transmit to the AN a second message, the second message requesting information about the UE, prior to receiving the first message transmitted by the AN.

11. The AMF of claim 8, further being configured to:
    receive a second message transmitted by the AN, the second message indicating that the UE is not reachable prior to receiving the first message transmitted by the AN; and
    in response to receiving the second message and determining that the certain ME is configured for the UE, send to a core network function (CNF) a message indicating that the UE is unreachable.

12. The AMF of claim 11, wherein the message indicating that the UE is unreachable indicates that a Protocol Data unit (PDU) session for the UE is subject for high latency communication (HLCOM).

13. The AMF of claim 8, further being configured to:
    receive from the CNF a message requesting reachability information for the UE, after transmitting the message to the CNF; and
    in response to the message from the CNF, obtain reachability information for the UE, which information indicates whether the UE is reachable, and forwarding the obtained reachability information to the CNF, wherein being configured to obtain the reachability information for the UE comprises being configured to obtain the reachability information from the first message.

14. The AMF of claim 8, further being configured to:
    as a result of receiving the first message indicating that the UE is not reachable and determining that the certain ME is configured for the UE, send a notification indicating that a certain notification will be sent as a result of the AMF determining that the UE is reachable.

* * * * *